June 24, 1969 W. H. GROVER 3,451,372
INSTRUMENT ILLUMINATOR
Filed Oct. 3, 1966
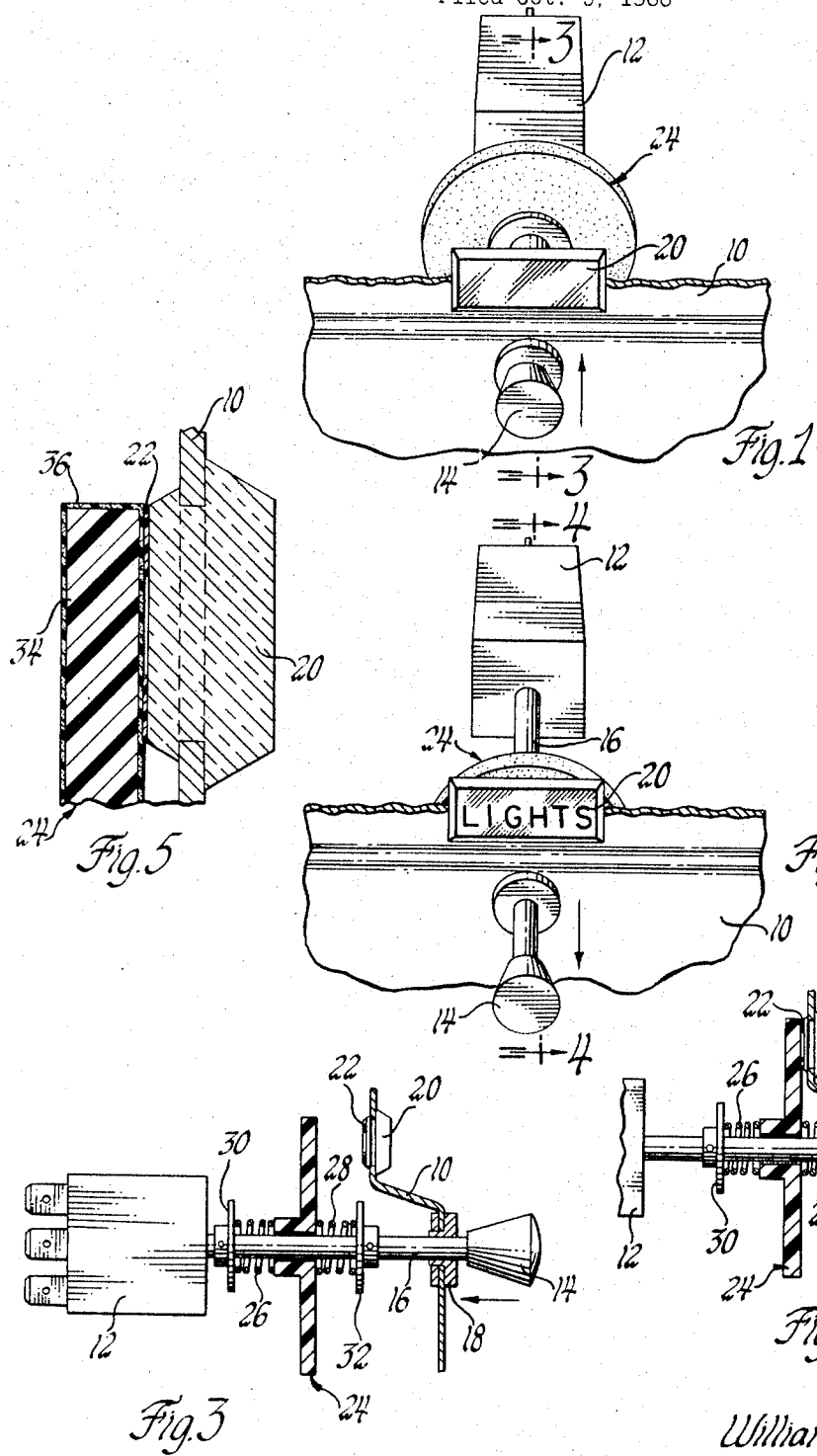
INVENTOR.
William H. Grover
BY
Donald P. Selwecki
ATTORNEY United States Patent Office 3,451,372
Patented June 24, 1969

3,451,372
INSTRUMENT ILLUMINATOR
William H. Grover, New Haven, Conn., assignor to General Motors Corporation, Detroit, Mich., a corporation of Delaware
Filed Oct. 3, 1966, Ser. No. 583,871
Int. Cl. G09f 9/00
U.S. Cl. 116—135                                             3 Claims

ABSTRACT OF THE DISCLOSURE

In a preferred form, this disclosure relates to an electric switch which includes a switch actuator slidably supported by a panel for movement relative thereto between on and off positions and an indicating means for providing a visual indication when the switch actuator is in the on position. The indicating means includes opaque means mounted on the panel at a location spaced from the switch actuator and with the opaque means having transparent indicia bearing areas. The indicating means further includes a flourescent means supported by the switch actuator for movement therewith between a remote position in which it is spaced from the opaque means when the switch actuator is in the off position and a position in which it is proximate the opaque means when the switch actuator is in the on position to provide a visual indication that the switch actuator is in the on position.

---

This invention relates to indicating apparatus and more specifically to apparatus which provides an indicia for a selected mode of an electric switch.

Headlamp switches commonly in use in motor vehicles are pulled to place headlamps or headlamps and associated mechanism into an operative disposition. Very often the amount of switch actuator movement is not enough to visually apprise a driver of whether or not the headlamps are energized. This is particularly true during daylight hours when the lights directed to the front of a vehicle are essentially invisible from inside the vehicle. Consequently, it is desirable to provide an indicator which apprises a vehicle operator of whether or not the headlamps are energized during daylight hours without utilizing battery power to do so.

It is an object of the present invention to provide an improved headlamp actuator which responds to ambient light to indicate a selected mode of the headlamp switch.

It is another object of the present invention to provide an indicating means consistent with the aforementioned object utilizing no electrical power.

Still another object of the present invention is to provide a headlamp condition indicator which is bright enough to be visible in the daytime and which is not a distraction in a vehicle driving compartment during nighttime hours.

It is a further object of the present invention to provide a headlamp condition indicator which is easy to operate and economical to manufacture.

Further objects and advantages of the present invention will be apparent from the following description, reference being had to the accompanying drawings wherein a preferred embodiment of the present invention is clearly shown.

In the drawings:

FIGURE 1 illustrates an elevational view of the subject invention in its operative environment;

FIGURE 2 is an elevational view of the subject invention similar to FIGURE 1 but with the indicating means illustrated in an actuated condition;

FIGURE 3 is a sectional view taken along line 3—3 of FIGURE 1;

FIGURE 4 is a sectional view taken along line 4—4 of FIGURE 2;

FIGURE 5 is an enlarged fragmentary sectional view of the fluorescent and opaque means of the subject invention.

Referring to FIGURE 1, an instrument panel 10 positioned in the driving compartment of a vehicle carries an automotive headlamp switch 12. An actuator knob 14 actuates switch 12 by being axially moved through panel 10.

Referring to FIGURE 3, it is seen that actuator knob 14 is carried by shaft 16 movable in sleeve 18 carried by panel 10. It is clear that panel 10 is a relatively fixed portion of the vehicle which also carries opaque means 20.

Referring to FIGURE 5, opaque means 20 is illustrated as being a transparent body made opaque by a coating 22 on one face thereof, said coating having an indicia formed therein such as seen in FIGURE 2 by the word "LIGHT." It is to be noted that the body 20 can be of any well-known transparent material and coating 22 can take many forms preferably a proprietary compound capable of providing a stable coating on the material of which the opaque body 20 is composed. Obviously, the body could be a solid opaque material with transparent areas formed therein.

Referring to FIGURE 3, fluorescent means 24 is illustrated as being slidably carried on shaft 16 and biasedly centered between springs 26 and 28 held operatively positioned by lock washers 30 and 32.

Referring to FIGURE 5, fluorescent means 24 can be composed of a base material 34 which might be any suitable type of plastic or metal to which a fluorescent coating 36 can be adhered. Fluorescent material 36 is most desirably a fluorescent paint which glows in the presence of ultraviolet light. It is clear that many materials of well-known composition could be utilized keeping within the sphere of the invention disclosed.

In operation, switch 12 is energized by moving actuator knob 14 from the position shown in FIGURE 1 to the position shown in FIGURE 2 or from the position shown in FIGURE 3 to the position shown in FIGURE 4. As this movement is accomplished, fluorescent means 24 moves from the position shown in FIGURE 3 until it comes into proximity with opaque means 20. When this occurs, fluorescent coating 36 comes into contact with opaque coating 22 or very near thereto. As previously stated, gaps or transparent areas are left in coating 22, resulting in a portion of fluorescent coating 36 being exposed to ambient light in the driving compartment of the vehicle in the vicinity of actuator knob 14.

Therefore, it becomes clear that transparent material 20 transmits light through the openings in coating 22 to expose coating 36 which is a fluorescent material. Ultraviolet light is thus emitted through transparent material 20 and causes the fluorescent material to glow. The glow of the fluorescent material takes on the shape of the gaps left in coating 22 and thus provides a visual indication to the operator that the headlamps are on. As seen in FIGURE 2, these gaps could take the shape of indicia, such as the word "LIGHT," to indicate that the vehicle headlamps are energized.

The subject invention has particular utility in the environment of an automotive headlamp switch because, as previously stated, the fact of the lamps being energized is not obvious during daylight hours and an incandescent lamp capable of providing such an indication during daylight would provide too much glare in the driving compartment during nighttime hours. It is obvious that the subject invention is operative only during daytime hours and would automatically respond to ambient light in the driver's compartment in the nighttime to give an indication if such ambient light were present. Such a nighttime response would not be necessary due to the fact that the headlamps are visible at night but, in any event, would not be of an intensity sufficient to distract the vehicle operator while driving at night.

It is also apparent the subject invention finds utility in environments other than herein described, for example, an actuator knob of an ordinary household appliance might utilize the present invention to indicate a selected mode of the dial and might provide thereby a mechanical utility as well as having certain aesthetic qualities.

While the embodiment of the present invention, as herein disclosed, constitutes a preferred form, it is to be understood that other forms might be adopted.

What is claimed is:

1. In an apparatus having a panel and an electric switch which includes a switch actuator slidably supported by the panel and movable relative thereto between ON and OFF positions, the improvement comprising: an indicating means for providing a visual indication when the switch actuator is in the ON position, said indicating means including opaque means mounted on the panel at a location radially spaced from the switch actuator, said opaque means having transparent indicia bearing areas through which light can pass, and fluorescent means supported by said switch actuator for movement therewith between first and second positions, said fluorescent means being in said first position in which it is spaced from said opaque means when said switch actuator is in the OFF position, said fluorescent means being in said second position in which it is adjacent said transparent indicia bearing areas when said switch actuator is in the ON position to provide a visual indication that the switch actuator is in the ON position.

2. In an apparatus as defined in claim 1 wherein said panel is an instrument panel of an automotive vehicle and wherein said switch is a headlamp switch for actuating the headlamps of the vehicle.

3. In an apparatus having a panel and an electric switch which includes a switch actuator slidably supported by said panel for linear movement relative thereto between ON and OFF positions, the improvement comprising: an indicating means for providing a visual indication when the switch actuator is in the ON position, said indicating means including opaque means mounted on said panel at a location radially spaced from said switch actuator, said opaque means having transparent indicia bearing areas through which light can pass, fluorescent means slidably supported by said switch actuator for linear movement relative thereto, spring means in engagement with said switch actuator and said fluorescent means for biasing said fluorescent means toward a normal position relative to said switch actuator and for effecting movement of said fluorescent means with said switch actuator when the latter is moved, said fluorescent means being movable between a first position in which it is spaced from said opaque means when the switch actuator is in its OFF position and a second position in which it is adjacent said transparent indicia bearing when the switch actuator is in the ON position, said fluorescent means emitting light through said transparent areas of said opaque means to provide a visual indication that the switch is in the ON position.

References Cited

UNITED STATES PATENTS

| 1,745,624 | 2/1930 | Kiefer | 250—75 |
| 2,285,374 | 6/1942 | Dohsmann et al. | 116—124.1 |
| 2,541,892 | 2/1951 | Schulze | 116—129 |
| 2,954,632 | 10/1960 | Ambrose | 40—331 |
| 3,213,269 | 10/1965 | Melvin et al. | 240—25 |
| 3,220,375 | 11/1965 | Gruber et al. | 116—70 |
| 3,237,591 | 3/1966 | Pichel | 116—124 |
| 3,305,677 | 2/1967 | Bov | 200—167 |
| 3,366,765 | 1/1966 | Beale | 200—172 |
| 3,368,751 | 2/1968 | Merrill | 116—114 XR |

FOREIGN PATENTS 1,429,478 1/1966 France.

LOUIS J. CAPOZI, *Primary Examiner.*

U.S. Cl. X.R.

116—114; 200—167; 250—72